United States Patent [19]

Pederson et al.

[11] Patent Number: 6,047,901

[45] Date of Patent: Apr. 11, 2000

[54] SPRAY BOOM SUPPORT ASSEMBLY

[75] Inventors: Randy J. Pederson; Steven W. Claussen; Robert L. Claussen, all of Benson, Minn.

[73] Assignee: C. A. P., Inc., Benson, Minn.

[21] Appl. No.: 09/148,167

[22] Filed: Sep. 4, 1998

[51] Int. Cl.[7] .................................................. A01C 3/06
[52] U.S. Cl. ........................ 239/159; 239/166; 239/172; 248/654
[58] Field of Search ..................................... 239/159, 160, 239/164, 166, 172, 176; 267/276, 280; 248/609, 654

[56] References Cited

U.S. PATENT DOCUMENTS

| | | | |
|---|---|---|---|
| Re. 28,259 | 12/1974 | Henschen | 267/57.1 |
| 2,641,505 | 6/1953 | Valois | 299/42 |
| 2,910,112 | 10/1959 | Ogden | 267/276 |
| 3,436,069 | 4/1969 | Henschen | 267/57.1 |
| 3,447,750 | 6/1969 | Weston | 239/159 |
| 3,823,932 | 7/1974 | Simons | 267/276 |
| 4,273,285 | 6/1981 | Scholbrock | 239/164 |
| 4,854,503 | 8/1989 | Little et al. | 239/166 |
| 4,880,160 | 11/1989 | Patterson et al. | 239/159 |
| 5,248,090 | 9/1993 | Williamson | 239/168 |
| 5,277,450 | 1/1994 | Henschen | 280/717 |
| 5,375,767 | 12/1994 | Thorstensson | 239/164 |
| 5,411,287 | 5/1995 | Henschen | 280/717 |
| 5,520,335 | 5/1996 | Claussen et al. | 239/104 |
| 5,884,852 | 3/1999 | Balmer | 239/159 |

FOREIGN PATENT DOCUMENTS 2102661  2/1983  United Kingdom ................... 239/164

*Primary Examiner*—Charles R. Eloshway
*Attorney, Agent, or Firm*—William L. Huebsch

[57] ABSTRACT

A support assembly supporting a spray boom assembly from a liquid supply assembly. Spaced support arms have opposite ends pivotably mounted on frames of the liquid supply assembly and the boom assembly to afford movement of the spray boom assembly between raised and lowered positions by a changeable length assembly such as a hydraulic piston, and shocks or bouncing action transmitted from the liquid supply assembly are damped by an assembly comprising an elongate shaft, an elongate tube around the shaft, resiliently elastic shock absorbing strips disposed between the shaft and the tube that with surfaces of the shaft and tube are shaped to restrict rotation of the tube around the shaft without resilient compression of the shock absorbing strips. Either the shaft or tube is fixed to the frame or the support arms, the other has an activating arm fixed to and projecting from it, which activating arm is pivotably attached to one end of the changeable length means. Thus, a shock or bouncing action at the liquid supply assembly will be effectively damped by relative rotation between the shaft and the tube and resultant resilient compression of the shock absorbing strips.

7 Claims, 3 Drawing Sheets

SPRAY BOOM SUPPORT ASSEMBLY

FIELD OF THE INVENTION

The present invention relates to assemblies for supporting the frame of one structure from the frame of another, and one particular aspect to such assemblies on field sprayers for supporting the frames of a spray boom assemblies from the frames of liquid supply assemblies.

BACKGROUND OF THE INVENTION

One type of field sprayer adapted for applying liquid chemical solutions (e.g., weed control chemicals or fertilizers) over fields typically comprises (1) a liquid supply assembly including a liquid supply tank and a pump, which liquid supply assembly can be mounted on the rear end of a tractor or can be in the form of a trailer adapted to be puled by a tractor, and (2) an elongate boom assembly mounted on the liquid supply assembly. The elongate boom assembly typically extends transversely across one end and for a large distance on both sides of the liquid supply assembly, and includes piping leading to a row of spaced outlet spray nozzles along its length through which liquid pumped from the liquid supply assembly is sprayed toward the ground. It is desirable to dampen or cushion the boom assembly from any shocks from or bouncing action of the liquid supply assembly, particularly because elongate end portions of the boom assembly are cantilevered and can be caused to move excessively because of such shocks or bouncing action.

One known type of support assembly for supporting a spray boom assembly from a liquid supply assembly includes first and second horizontally spaced sets of support arms with two vertically spaced support arms in each of the sets. Supported ends of the support arms are pivotably mounted on a frame of the liquid supply assembly and opposite supporting ends of the support arms are pivotably mounted on a frame of the boom assembly to afford movement of the spray boom assembly between a raised position with the support arms extending generally upwardly from the liquid supply assembly to the spray boom assembly, and lowered positions with the support arms extending generally horizontally or downwardly from the frame of the liquid supply assembly to the frame of said spray boom assembly. Hydraulic cylinder assemblies are provided for positioning the frame of the spray boom assembly at any position between its raised and lowered positions. An attempt to dampen or cushion the transfer of any bouncing action of or shocks from the liquid supply assembly to the boom assembly has been made by providing an air chamber communicating with the lines supplying hydraulic liquid to the hydraulic cylinder assemblies so that such bouncing action or shocks will cause fluid to flow out of the hydraulic cylinder assemblies and compress the air in the air chamber to provide that damping. The effectiveness of this approach is limited, however, because the passageway through which hydraulic liquid must pass into and out of the hydraulic cylinder assemblies is restricted by small orifices (e.g., 0.060 inch diameter orifices). These small orifices are provided to slow the release of liquid from the hydraulic cylinder assemblies in the event that the hydraulic lines supplying the hydraulic cylinder assemblies should break or be severed, thereby giving an operator time to stop movement of the field sprayer before the spray boom assembly strikes the ground. Those orifices, while providing that function, also limit the flow of fluid out of the hydraulic cylinder assemblies when a shock or bouncing action occurs in the liquid supply assembly, thereby limiting the amount of dampening or cushioning that can be provided by the compression of air in the air chamber.

DISCLOSURE OF THE INVENTION

The present invention provides an effective means that can be used on a field sprayer for damping or cushioning the transfer of any bouncing action of or shocks from a liquid supply assembly to a boom assembly carried by that liquid supply assembly.

According to the present invention there is provided a support assembly adapted for use on a field sprayer to support a spray boom assembly from a liquid supply assembly. That support assembly includes a plurality of horizontally and vertically spaced support arms. Supported ends of the support arms are pivotably mounted on a frame of the liquid supply assembly and opposite supporting ends of the support arms are pivotably mounted on a frame of the boom assembly to afford movement of the spray boom assembly between a raised position with the support arms extending generally upwardly from the liquid supply assembly to the spray boom assembly, and lowered positions with the support arms extending generally horizontally or downwardly from the frame of said liquid supply assembly to the frame of said spray boom assembly. Means are provided between one of the frames and the support arms for positioning the frame of the spray boom assembly at any desired position between its raised and lowered positions and for damping shocks or bouncing action transmitted between the frames. That means includes one or more hydraulic piston assemblies or other changeable length assemblies or means (e.g., mechanically operated screw thread assemblies), and shock absorbing means between ends of the changeable length assemblies and one of the frames or the support arms. That shock absorbing means comprises (1) an elongate shaft member, (2) an elongate tube member having an axially extending through opening, which tube is positioned around the shaft, (3) elongate resiliently elastic shock absorbing strips disposed between surfaces on the periphery of the shaft and defining the through opening of the tube, which surfaces and shock absorbing strips are shaped and sized to restrict rotation of the tube around the shaft without resilient compression of the shock absorbing strips. Either the shaft member or the tube member is fixed either to the frame or to the support arms, and an activating arm has an inner end fixed to the shaft or tube member that is not fixed to the frame and extends generally radially of the axes of those members. An outer end of the activating arm is pivotably attached to one end of the changeable length assembly, and the other end of the changeable length assembly is attached to a support arm or one of the frames so that a shock or bouncing action at the liquid supply assembly will be effectively damped by relative rotation between the shaft and the tube and resultant resilient compression of the shock absorbing strips.

Preferably, the shaft member is fixed at its ends to the frame of the liquid supply assembly, and the shock absorbing means includes two of the activating arms fixed at the opposite ends of the tube member, with the outer ends of those activating arms being pivotably attached to the ends of two spaced hydraulic piston assemblies which have their opposite ends pivotably attached to two spaced support arms.

BRIEF DESCRIPTION OF THE DRAWING

The present invention will be further described with reference to the accompanying drawing wherein like reference numerals refer to like parts in the several views, and wherein.

DETAILED DESCRIPTION OF THE INVENTION

Figure 1:
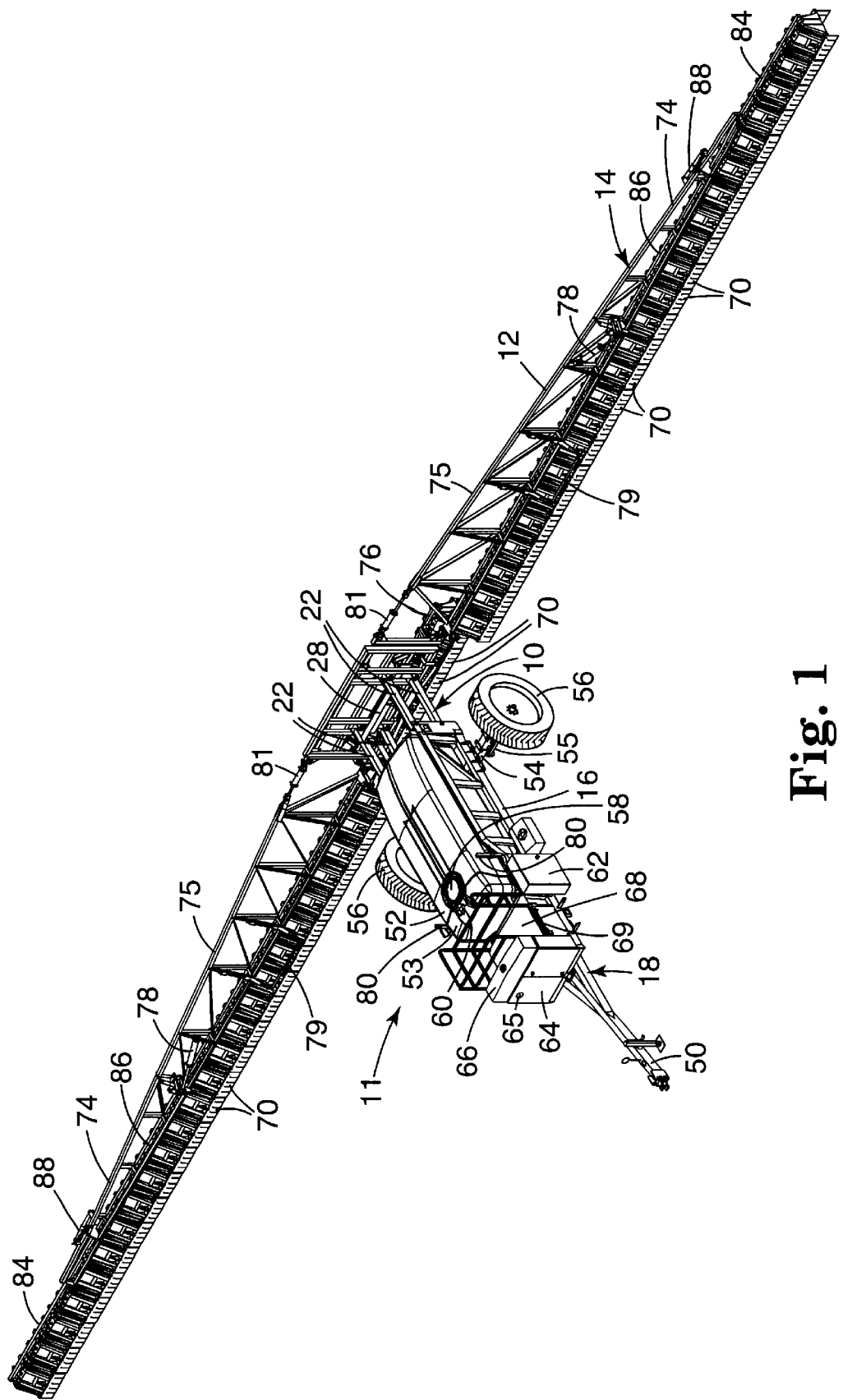
FIG. 1 is a perspective view of a field sprayer including a support assembly according to the present invention in a lowered position and in which a boom assembly supported by the support assembly is in a use position.

Referring now to the drawing there is shown one embodiment of a support assembly according to the present invention generally designated by the reference numeral 10. The support assembly 10 is illustrated on a field sprayer 11 supporting a frame 12 of a spray boom assembly 14 from a frame 16 of a liquid supply assembly 18.

Figure 2:
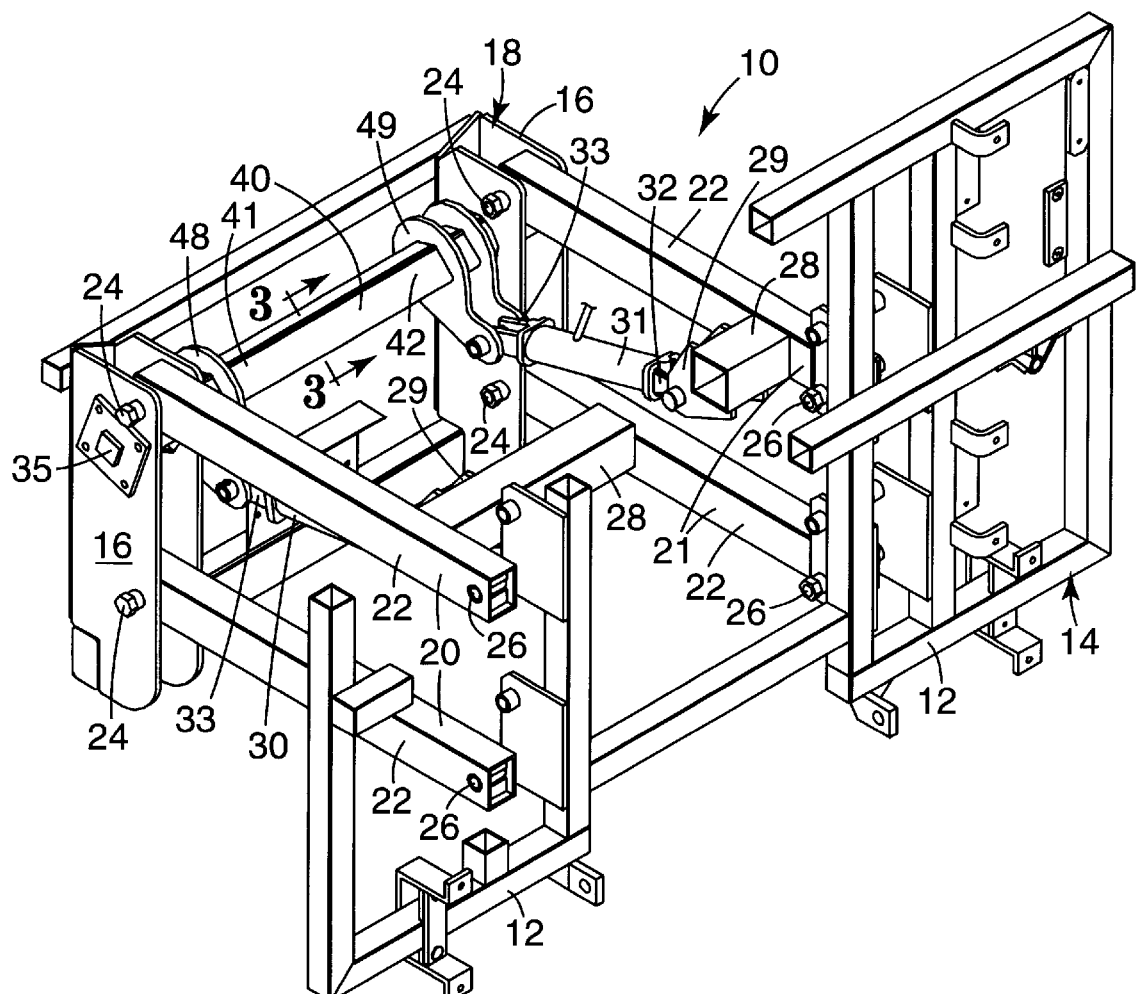
FIG. 2 is an enlarged fragmentary perspective view of the support assembly of FIG. 1 having parts broken away to show details.

Generally, as is best seen in FIG. 2, the support assembly 10 comprises first and second horizontally spaced sets 20 and 21 of elongate support arms 22 with two vertically spaced upper and lower support arms 22 of the same length in each of those sets 20 and 21. Supported ends of those support arms 22 are mounted on the frame 16 of the liquid supply assembly 18 by bolts 24 for pivotal movement about generally horizontal axes, and opposite supporting ends of those support arms 22 are mounted on the frame 12 of the spray boom assembly 14 by bolts 26 for pivotal movement about generally horizontal axes to afford movement of the spray boom assembly 14 between a raised position with the support arms 22 extending generally upwardly from the frame 16 of the liquid supply assembly 18 to the frame 12 of the spray boom assembly 14, and lowered positions with the support arms 22 extending generally horizontally as shown in FIGS. 1 and 2, or with the support arms 22 extending downwardly from the frame 16 of the liquid supply assembly 18 to the frame 12 of the spray boom assembly 14. Both sets 20 and 21 of support arms 22 form a parallelogram with the frames 16 and 12 so that the frame 12 of the spray boom assembly will not rotate relative to the frame 16 of the liquid supply assembly as the boom assembly 14 is moved between its raised and lowered positions so that spray nozzles on the spray boom assembly 14 will direct spray in the same direction toward the ground in all of those positions. Means are provided for positioning the frame 12 of the spray boom assembly 14 at any desired position between its raised and lowered positions and for damping shocks or bouncing action transmitted from the frame 16 of the liquid supply assembly 18 to the frame 12 of the spray boom assembly 14. Those means comprise changeable length means or assemblies in the form of a first hydraulic piston assembly 30 adjacent the first set 20 of support arms 22 and a second hydraulic piston assembly 31 adjacent the second set 21 of support arms 22. Each of the hydraulic piston assemblies 30 and 31 has a first end 32 pivotably mounted on one of the upper support arms 22 by a bracket 29 on a brace 28 that is attached to and extends between the two upper support arms 22. Each of the hydraulic piston assemblies 30 and 31 also has an opposite second end 33, and conventional hydraulically operated means between its first and second ends 32 and 33 for changing the length of the hydraulic piston assembly 30 or 31 by causing a piston to move in or out of a cylinder of the assembly 30 or 31. Shock absorbing means are provided between the second ends 33 of the hydraulic piston assemblies 30 and 31 and the frame 16 of the liquid supply assembly 18. That shock absorbing means comprises an assembly including elongate shaft member 35 having its opposite ends fixed or welded to the frame 16 of the liquid supply assembly 18, which shaft member 35 has a peripheral surface around its elongate axis defined by a plurality of longitudinally extending generally planer surfaces 38 (see FIG. 3). An elongate tube member 40 having opposite first and second ends 41 and 42 and an axially extending through opening between its ends 41 and 42 is positioned around the shaft member 35 with the axes of the shaft member 35 and tube member 40 generally parallel and coincident, with the first end 41 of the tube member 40 adjacent the first set 20 of support arms 22, and with the second end 42 of the tube member 40 adjacent the second set 21 of support arms 22. The through opening of the tube member 40 is defined by a plurality of longitudinally extending generally planer surfaces 44. Elongate resiliently elastic polymeric (e.g., urethane) shock absorbing strips 46 are disposed between the generally planer surfaces 38 and 44 of the shaft member 35 and the tube member 40 and with the surfaces 38 and 44 are shaped to restrict rotation of the tube member 40 around the shaft member 35 without compression of the shock absorbing strips 46. First and second activating arms 48 and 49 have inner ends fixed or welded to the opposite ends 41 and 42 the tube member 40 with the first activating arm 48 at the first end 41 of the tube member 40 and the second activating arm 42 at the second end 42 of the tube member 40. The first and second activating arms 48 and 49 extend generally radially of the axis of the tube member 40, with the outer end of the first activating arm 48 being pivotably attached to the second end 33 of the first hydraulic piston assembly 30, and the outer end of the second activating arm 49 being pivotably attached to the second end 33 of the second hydraulic piston assembly 31. Shock or bouncing action at the frame 16 of the liquid supply assembly 18 will be effectively damped by relative rotation between the shaft and tube members 35 and 40 and resultant resilient compression of the shock absorbing strips 46. The shaft member 35, tube member 40 and shock absorbing strips 46 were obtained as a special order assembly from Henchen Corporation, Jackson Center, Ohio.

As illustrated, the frame 16 of the liquid supply assembly 18 is in the form of a trailer having a generally vertical rear end at which the support arms 22 are mounted, a front end portion including a tongue 50 adapted to be attached to the draw bar of a tractor, a central portion defining a socket in which are received and supported bottom portions of a pair of closely adjacent tanks 52 and 53, and under which central portion is a transverse member 54 of the frame 16 to which are attached a pair of projecting axles 55. On distal ends of the axles 55 are rotateably mounted a pair of large diameter wheels 56 (e.g., including 12.4×42 tires) which provide high clearance for the frame 16 (e.g., 27 to 39 inch clearance). The axles 55 are adjustably mounted to the transverse member 54 of the frame 16 to afford spacing the wheels 56 at different distances from the frame 16 and from each other. The tanks 52 and 53 are rotary molded of a polymeric material (e.g., linear low density polyethylene). The larger of the tanks 52 (e.g., 750, 1000, or 1350 gallon capacity) holds the liquid chemical solution (e.g., a weed control chemical or fertilizer) to be applied by the field sprayer 11, and has a covered access opening 58 adjacent its front end. The smaller of the tanks 53 (e.g., 100-gallon capacity) holds water by which the spray system (including the interior of the large tank 52 and the liquid distribution system including the spray nozzles) can be rinsed after it is used to spray the chemical solution and has a covered access opening 60. The liquid supply assembly 18 includes a hydraulically operated pump (not shown) such as a "Hypro" hydraulic centrifugal HM1 or HM4 or a "Hypro" hydraulic diaphragm model 230 connectable by conventional means to the hydraulic system of a tractor to which the tongue 50 is attached. The hydraulic pump can be connected to pump liquids into the tanks 52 and 53 from an outside source, or to pump liquid out of the tanks through liquid distribution system including its spaced spray nozzles on the boom assembly 14, with the liquid being selectively pumpable through different groups of spray nozzles along the boom assembly 14 (e.g., through spray nozzles spaced along 3 or 5 different portions of the boom assembly 14) through the use of electrically controlled shut off valves included in the distribution system. Controls to provide these various functions are provided behind an outer door of a control panel 62. Inside a front panel 64 are the electrically controlled shut off valves, together with a pressure regulator and filter included in the liquid distribution system. A pressure gauge 65 showing the pressure developed by the pump in the liquid distribution system is visible through an opening in the front panel 64. A small safety water tank 66 (e.g., 15-gallon capacity) is mounted above the panel 64 so that the operator can have a source of clean water to wash his hands, etc. A platform 68 accessible by and retractable ladder 69 is provided at the front of the tanks 52 and 53 to afford access to their openings 58 and 60.

The spray nozzles along the spray boom assembly 14 can be mounted directly on the frame 12 or, as illustrated can be mounted on a series of spray hoods 70 of the type described in U.S. Pat. No. 5,520,335 (the content whereof is incorporated herein by reference), which spray hoods 70 are in turn mounted along the frame 12.

The spray boom assembly 14 can be moved between raised and lowered positions by positioning the support assembly 10 in its raised and lowered positions as described above by use of a conventional hydraulic system connected to the hydraulic cylinder assemblies 30 and 31 and powered by the hydraulic system of a tractor to which the field sprayer 11 is connected. The hydraulic cylinder assemblies 30 and 31 are preferably of the type called "rephasing" hydraulic cylinder assemblies which are a matched pair and insure that pistons in both of the cylinder assemblies 30 and 31 will move together when moving the support assembly 10 and thereby the spray boom assembly 14 between its raised and lowered positions, thus restricting binding between portions of the support assembly 10. The passageways through which hydraulic liquid must pass into and out of the hydraulic cylinder assemblies 30 and 31 are restricted by small orifices (e.g., 0.060 inch diameter orifices) for the reason described above.

Figure 3:
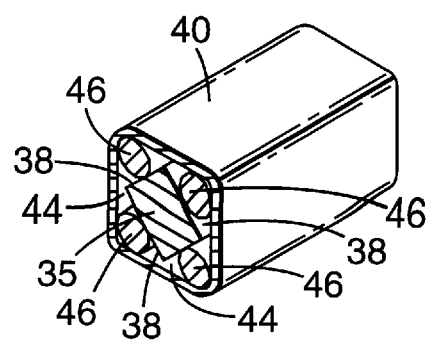
FIG. 3 is a fragmentary sectional view taken approximately along line 3—3 of FIG. 2.
Figure 4:
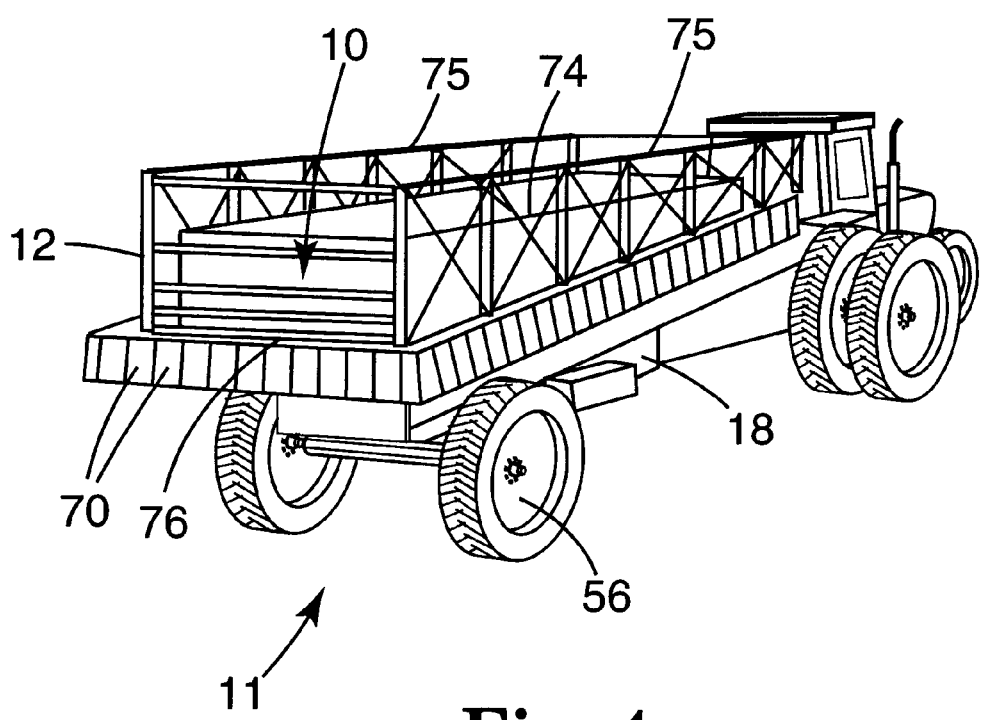
FIG. 4 is a perspective view of the field sprayer of FIG. 1 in which the support assembly according to the present invention is in a raised position and the boom assembly is in a storage position.

The frame 12 of the spray boom assembly 14 includes five frame portions mounted for pivotable motion relative to each other about vertical pivot axes. Those frame portions include outer portions 74, intermediate portions 75, and a center portion 76 to which the support assembly 10 is attached. The outer and intermediate portions 74 and 75 are pivotable by activating hydraulic cylinder assemblies 78 connected between adjacent portions 74, 75, and 76 between use positions (FIG. 1) with the five frame portions 74, 75, and 76 generally aligned at which the support assembly 10 can be positioned in a desired one of its lowered positions (or in its raised position) and the liquid solution can be sprayed through the spray boom assembly 14; and storage positions as illustrated in FIG. 4. In the storage positions the outer portions 74 are folded 180 degrees against the side adjacent the frame 16 of the adjacent intermediate portion 75, and each folded pair of outer and intermediate portions 74 and 75 is folded about 90 degrees from the central portion 76 to lay along the adjacent side of the frame 16. In the storage positions, as illustrated in FIG. 3, the support assembly 10 can be positioned in its raised position, and each folded pair of outer and intermediate boom portions 74 and 75 can be supported on the frame 18 by the engagement of support brackets 79 on the frame 12 over upwardly projecting post-like portions 80 of the frame 16. The spray boom assembly 14 includes hydraulic cylinder assemblies 81 between its center and intermediate frame portions 76 and 75 by which the elevation of the outer ends of the spray boom assembly 14 can be adjusted relative to its center portion 76. Also, the outer portions 74 of the frame are in two parts including an outermost part 84 pivotable around a vertical axis relative to an innermost part 86. Each outermost part 84 is adapted to pivot relative to the innermost part 86 by which it is supported should the outermost part 84 strike an obstruction when the boom assembly 14 is moving. A shock absorber 88 is connected between those parts 84 and 86 to restrict such pivoting of the outermost part 84 relative to the innermost part 86.

The present invention has now been described with reference to one embodiment thereof. It will be apparent to those skilled in the art that many changes can be made in the embodiments described without departing from the scope of the present invention. For example, to provide the shock absorbing means either the shaft member 35 or the tube member 40 of the shock absorbing assembly can be fixed either to the frame 16 of the liquid supply assembly 18, to the frame 12 of the spray boom assembly 14, or to the support arms 22 with the inner ends of the activating arms 48 and 49 fixed to the opposite ends of the shaft or tube member 35 or 40 that is not so fixed, and the outer ends of those activating arms 48 and 49 can each be pivotably attached to one of the ends of the changeable length assemblies with the other ends of the changeable length assemblies being attached to the support arms 22 or to one of the frames 12 or 16 in an orientation such that changing the lengths of the changeable length assemblies will move the support member 10 between its raised and lowered positions, while relative rotation of the shaft and tube members 35 and 40 will provide the shock absorbing means. For some applications changeable length assemblies other than hydraulic piston assemblies can be used, such as mechanically operated screw thread assemblies that change length by changing the degree of threaded engagement of one portion with another. For some applications the support arms 22 need not be positioned to form spaced parallelograms as do the support arms 22 described above. Also, for some applications it may be acceptable to use a single changeable length assembly and shock absorbing means positioned midway between the spaced sets 20 and 21 of elongate support arms 22 described above. Thus, the scope of the present invention should not be limited to the structure described in this application, but only by the structures and method described by the language of the claims and the equivalents thereof.

What is claimed is:

1. A support assembly adapted for use on a field sprayer to support a spray boom assembly from a liquid supply assembly, said support assembly comprising:

a plurality of horizontally and vertically spaced support arms each having opposite supported and supporting ends, said supported ends of said support arms being adapted to be mounted on a frame of said liquid supply assembly and said supporting ends of said support arms being adapted to be mounted on a frame of said spray boom assembly for pivotal movement of said ends about generally parallel axes to afford movement of said frame of the spray boom assembly between a raised position with said support arms extending generally upwardly from the frame of said liquid supply assembly to the frame of said spray boom assembly, and lowered positions with said arms extending generally horizontally or downwardly from the frame of said liquid supply assembly to the frame of said spray boom assembly; and support means for positioning the frame of said spray boom assembly at any position between said raised and lowered positions and for damping shocks or bouncing action transmitted between said frames, said support means comprising a changeable length assembly having first and second opposite ends, and means between said first and second ends for changing the length of said changeable length assembly, and shock absorbing means comprising:
an elongate shaft member having an axis,
an elongate tube member having an axis and an axially extending through opening, said tube member being positioned around said shaft member with the axes of said shaft and tube members being generally parallel,
elongate resiliently elastic shock absorbing strips disposed between said shaft and said tube, adjacent surfaces of said strips and said shaft and tube members being shaped to restrict rotation of said collar around said shaft without compression of said shock absorbing strips,
at least one activating arm having opposite inner and outer ends, said inner end of said arm being fixed to one of said shaft and tube members, said activating arm extending generally radially of the axes of said shaft and tube members, and the outer end of said activating arm being pivotably attached to the second end of said changeable length assembly,
one of said first end of said changeable length means and said member other than the member to which said arm is attached being adapted to be attached to one of said frames, and at least one of said support arms being attached to the other of said first end and said member other than the member to which said arm is attached, said first end of said changeable length means being pivotably attached and said member being fixedly attached.

2. A support assembly according to claim 1 wherein said one of said members is adapted to be fixed to the frame of said liquid supply assembly, and said first end of said changeable length means is pivotably attached to said one of said support arms.

3. A support assembly according to claim 1 wherein said shaft member is adapted to be fixed to the frame of said liquid supply assembly, said inner end of said activating arm is fixed to said tube member, and said fit end of said changeable length means is pivotably attached to said support arms.

4. A support assembly according to claim 1 including first and second horizontally spaced sets of said support arms with two vertically spaced support arms in each of said sets, said changeable length assembly comprising a first hydraulic piston assembly adjacent said first set of support arms and a second hydraulic piston assembly adjacent said second set of support arms, each of said hydraulic piston assemblies having a first end pivotably attached to one of said support arms and an opposite second end, and hydraulically operated means between said first and second ends for changing the length of said hydraulic piston assembly, said member of said shock absorbing means to which said activating arm is fixed has a first end adjacent said first set of support arms and a second end adjacent said second set of support arms, and said shock absorbing means comprises two of said activating arms fixed at the opposite ends of said member, the outer ends of said activating arms being pivotably attached to the second ends of said hydraulic piston assemblies.

5. A support assembly on a field sprayer supporting a frame of a spray boom assembly from a frame of a liquid supply assembly, said support assembly comprising:

first and second horizontally spaced sets of support arms with two vertically spaced support arms in each of said sets, said support arms having opposite supported and supporting opposite ends, said supported ends of said support arms being mounted on said frame of the liquid supply assembly for pivotal movement about generally horizontal axes and said supporting ends of said support arms being mounted on said frame of the boom assembly for pivotal movement about generally horizontal axes to afford movement of said spray boom assembly between a raised position with said support arms extending generally upwardly from said frame of the liquid supply assembly to the frame of said spray boom assembly, and lowered positions with said arms extending generally horizontally or downwardly from the frame of said liquid supply assembly to the frame of said spray boom assembly; and variable length support means for positioning the frame of said spray boom assembly at any position between said raised and lowered positions and for damping shocks or bouncing action transmitted from the frame of said liquid supply assembly to the frame of said spray boom assembly, said variable length support means comprising:

a first hydraulic piston assembly adjacent said first set of support arms and a second hydraulic piston assembly adjacent said second set of support arms, each of said hydraulic piston assemblies having a first end pivotably attached to one of said support arms, an opposite second end, and hydraulically operated means between said first and second ends for changing the length of said hydraulic piston assembly, and shock absorbing means between said second ends of said hydraulic piston assemblies and one of said frames, said shock absorbing means comprising:
elongate shaft having an axis and having opposite ends fixed to said one frame,
an elongate tube having an axis, having opposite first and second ends, and having an axially extending through opening between said ends, said tube being positioned around said shaft with the axes of said shaft and tube generally parallel, with said first end of said tube adjacent said first set of support arms, and with said second end of said tube adjacent said second set of support arms,
elongate resiliently elastic shock absorbing strips disposed between said shaft and said tube adjacent surfaces of said strips and said shaft and tube being shaped to restrict rotation of said collar around said shaft without compression of said shock absorbing strips, first and second actuating arms each having opposite inner and outer ends, the inner end of said first actuating arm being fixed at the first end of said tube and the inner end of said second actuating arm being fixed at the second end of said tube, said actuating arms extending generally radially of the axis of said tube, the outer end of said first actuating arm being pivotably attached to the second end of said first hydraulic piston assembly, and the outer end of said second actuating arm being pivotably attached to the second end of said second hydraulic piston assembly.

6. A support assembly according to claim 5 wherein said ends of said shaft are fixed to the frame of said liquid supply assembly.

7. A support assembly adapted for use to support a frame of a spray boom assembly from a frame of a liquid supply assembly, said support assembly comprising:

a plurality of horizontally and vertically spaced support arms each having opposite supported and supporting opposite ends, said supported ends of said support arms being adapted to be mounted on the frame of said liquid supply assembly and said supporting ends of said support arms being adapted to be mounted on the frame of said spray boom assembly for pivotal movement of said supported and supporting ends about generally parallel axes to afford movement of said frame of the spray boom assembly between a raised position with said support arms extending generally upwardly from the frame of said liquid supply assembly to the frame of said spray boom assembly, and a lowered position with said arms extending generally horizontally and the frame of said spray boom assembly spaced farther from the frame of said liquid supply assembly than in said raised position; and variable length support means for positioning the frame of said spray boom assembly at any position between said raised and lowered positions, said support means comprising changeable length means having a first end pivotably attached to one of said support arms, an opposite second end, and means between said first and second ends for changing the length of said changeable length means, and shock absorbing means between said second end of said changeable length means and one of said frames, said shock absorbing means comprising:

an elongate shaft having an axis and being adapted to be fixed to said one frame an elongate tube having an axis and an axially extending through opening, said tube being positioned around said shaft with the axes of said shaft and tube being generally parallel elongate resiliently elastic shock absorbing strips disposed between said shaft and said tube, adjacent surfaces of said strips and said shaft and tube being shaped to restrict rotation of said collar around said shaft without compression of said shock absorbing strips, at least one arm having opposite inner and outer ends, said inner end of said arm being fixed to said tube, said arm extending generally radially of the axis of said tube, and the outer end of said tube being pivotably attached to the second end of said changeable length means.

* * * * *